June 18, 1963 A. F. BARTOLAT 3,094,014
ROTATING GUIDE BORING BAR
Filed April 25, 1961 2 Sheets-Sheet 2
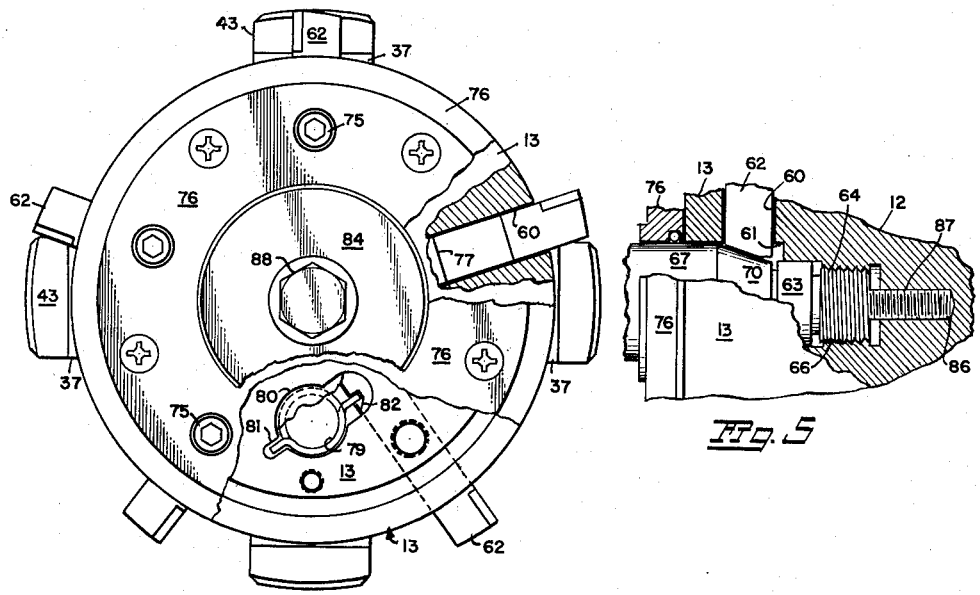
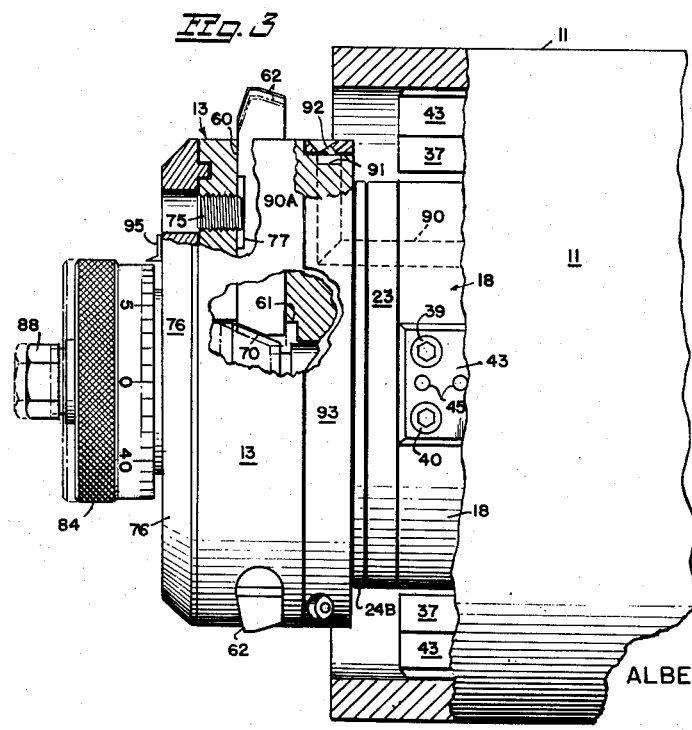
ALBERT F. BARTOLAT
INVENTOR.

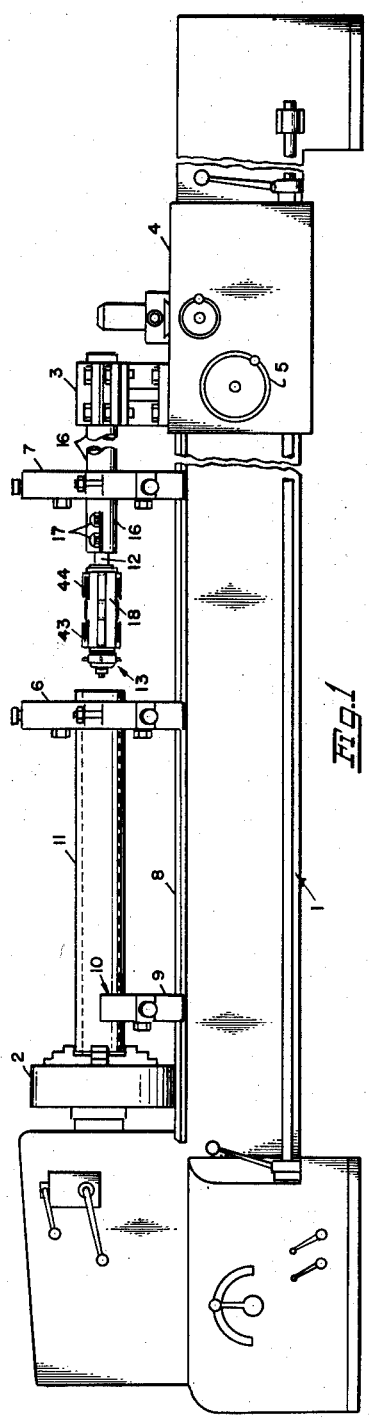

United States Patent Office 3,094,014
Patented June 18, 1963

3,094,014
ROTATING GUIDE BORING BAR
Albert F. Bartolat, Star Rte., Bend, Oreg.
Filed Apr. 25, 1961, Ser. No. 105,396
2 Claims. (Cl. 77—3)

This invention relates generally to improvements in boring bars and more especially to a rotary guide boring bar and cutter head particularly well adapted for use, though not restrictively, in boring pipes and other tubular structures.

It is one of the principal objects of my invention to provide a non-rotating unitary boring bar and cutter head of the character described wherein during the initial part of the boring operation the cutter head will be guided by a stationary non-rotating guide in axial alignment with the pipe or other tubular workpiece being dealt with, and after the head has advanced a predetermined distance into the workpiece will be thereafter guided by follow guides acting against the freshly cut bore.

Another object of my invention is to provide a novel boring tool which is provided with effective means for supporting the tool throughout the boring operation.

Another object of the invention is to provide a novel boring tool which includes a rotatable sleeve having yieldable supporting means thereon engageable with the freshly cut bore and slidable therealong as the boring operation progresses.

A further object of the invention is to provide the cutting tool with a micrometric head graduated in thousandths of an inch from 0 to 45 for simultaneously and accurately adjusting all of the cutters to a predetermined cutting diameter and also for retracting the cutters at the end of the cut out of damaging contact with the bore as the cutting tool is withdrawn from the workpiece and for resetting the cutters to their original setting preparatory to starting a subsequent boring operation.

The foregoing and other objects and advantages which will become subsequently apparent reside in the details of construction and operation as more fully hereinafter described and claimed, reference being had to the accompanying drawings forming a part hereof and in which:

FIGURE 1 is a side elevational view of an engine lathe showing my rotating guide boring bar operatively carried by the lathe and in position for advancement into a workpiece.

FIGURE 2 is a side elevational view of the boring tool, with fragments broken away and parts in section to reveal internal parts, and operatively disposed within a pipe being bored shown fragmentarily and in longitudinal section.

FIGURE 3 is a front elevational view on a still larger scale of the cutter head made in accordance with my invention.

FIGURE 4 is a side elevational view of FIGURE 3 with fragments of the cutter head broken away and showing the cutter head in a position slightly beyond the end of the tubular workpiece after completion of the boring operation therethrough.

FIGURE 5 is a fragmentary side elevational detail view of means for radially adjusting the cutter bits.

With continuing reference to the drawings wherein like reference characters designate like parts and particularly to FIGURE 1 thereof, reference numeral 1 indicates generally the bed of an engine lathe having a conventional power driven chuck 2 near one of its ends and a clamping block 3 mounted upon and adjustable lengthwise of the bed by a carriage 4 movable longitudinally of the lathe bed by a hand wheel 5. Two spaced apart 3-roller jaw steady rests 6 and 7 are adjustably secured to the top rails 8 of the engine bed as is also the bottom half 9 of a similar steady rest 10 near the chuck 2.

The workpiece to be internally bored and indicated at 11 is secured at one of its ends within the chuck 2 and its opposite end is rotatably mounted within the steady rest 6 and is also supported by the bottom half 9 of the steady rest 10.

As best illustrated in FIGURE 2 the forward end of a boring bar 12 is integrated with a cutter head indicated generally at 13 and its rearward end may be splined or provided with a suitable key slot 14 for engagement with a key 15 integrated with and extending radially inward from the forward end of a hollow bar-extension 16 which is held against rotation by secure clamped engagement within the block 3 on the carriage 4. This forward end of the bar-extension 16 may be split and provided with clamping bolts 17, as shown, if desired.

Rotatable about the boring bar 12 is a sleeve 18 open at both ends and counter bored as at 18A to accommodate needle bearings 19 and 20 respectively carried by inner races 20A and 18 held in place on the boring bar 12 by means of snap rings 21 and 22.

The forward end of the sleeve 18 is closed by an end bell 23 grooved as at 24 for the reception of a lubrication seal in the form of an O-ring 24A and a sealing gasket 24B is interposed between the end bell 23 and the adjacent face of the cutter head 13. The rearward end of the sleeve 18 is similarly closed by an end bell 26 provided with a sealing O-ring 26A and a gasket 26B compressed against the end bell 26 by a split collar 27 threaded as at 28 on the boring bar 12 and also provided with a sealing gasket 29. The split collar 27 is lockable to the boring bar 12 by a screw 30 threadedly extending through a pair of lugs 31 integrated with the collar 27.

Secured as at 32 to the sleeve 18 at equidistant spaced apart intervals about the outer periphery thereof, are preferably though not restrictively, four members 36 having forwardly and rearwardly extending yieldable arm portions 37 and 38. The members 36 are coextensive in length with the sleeve, as shown. Secured at their outer ends as at 39 and 40, to the forward end of the arms 37 and to the rearward ends of the arms 38 are rearwardly and forwardly extending guide pads 43 and 44 respectively which, due to the length of their free end portions, have a certain amount of inherent flexibility. To insure parallel alignment of the four members 36 with the longitudinal center line of the sleeve 18 I provide each member with a key 50 engageable within matching key slots in the member and in the sleeve 18. To insure similar alignment of the guide pads 43 and 44 I provide each with forwardly and rearwardly aligned pins 45 insertable within corresponding apertures in the outer ends of the arms 37 and 38.

The original inside diameter of the workpiece or pipe 11 to be bored is indicated at 55 and the predetermined finished inside diameter as the boring operation proceeds is indicated at 56 and this diameter is slightly less than the diametral spacing of the rearward and forward flexible free end portions of the guide pads 43 and 44 respectively when they are relaxed and before insertion within the pipe so that when inserted they will flex into frictional facial engagement with the finished inner periphery 56 of the pipe as the boring operation progresses and will rotate with the chuck-driven pipe while the boring bar 12 and cutter head 13 remain stationary.

The cutter head 13 is provided with preferably, though not restrictively, five radial slots 60 opening at their inner ends into an outwardly opening recess 61 in the head 13 and each slot is provided with a cutting tool 62. The recess 61 is reduced in diameter as at 63 and internally threaded as at 64 to accommodate the externally threaded end 66 of a shaft 67 rotatable within the recess 61 and tapered as at 70 to provide cam means for adjusting the cutting tools 62 radially relative to the head 13. The cutters are lockable in adjusted positions by means of set screws 75 threaded through a cover plate 76 and terminating at their inner ends within an elongated recess 77 formed in the adjacent face of the cutter tool. The cutters upon release of the set screws 75 are at all times maintained in effective contact with the tapered portion 70 of shaft 67 by means of coil springs 79 disposed within recesses 80 with one end of the spring engaged within a notch 81 in the wall of the recess and its opposite end in engagement with a notch 82 formed in the adjacent face of its respective cutting tool 62.

For accurately adjusting all of the cutters simultaneously to a predetermined cutting diameter I provide the outer end of the shaft 67 with a micrometric head 84 and the cutter head with a pointer 95. The head 84 is graduated in thousandths of an inch from zero to 45 as shown or to any other desired range.

A locking bolt 86 extends through the micrometric head 84, shaft 67, reduced end 63 thereof and terminates therebeyond within a threaded recess 87 within the boring bar 12 and the opposite end of the bolt is provided with a head 88. From the foregoing it will be readily apparent that advancement of the shaft 67 on the threads 64 by rotation of the head 84 will move the cutters readily outward simultaneously to an extent determined by the amount of rotation of the head. Following this the cutters are locked in their adjusted positions by rotating the bolt 86 and thus advancing its threaded end in the threads 87.

For supplying the proper cutting lubricants under pressure to the cutting tools 62 suitable for the kind of material being bored I provide a duct 90 connected at one of its ends (not shown) to a source of supply of lubricant. The opposite end of the duct 90 is in open communication through a radial port 90A with an annular groove 91 in the cuter head 13 covered by a ring 93 having diagonal outlet openings or nozzles 92 therein for directing the lubricant under pressure to the cutters and to the surfaces adjacent thereto.

While I have shown a particular form of embodiment of my invention, I am aware that many minor changes therein will readily suggest themselves to others skilled in the art without departing from the spirit and scope of the invention. Having thus described my invention what I claim as new and desire to protect by Letters Patent is:

1. A boring device including a stationary boring bar comprising a shaft having a forward end and a rearward end, means at said rearward end mounting said shaft coaxially with a rotationally driven work piece to be bored, a cutter head carried by the forward end of said shaft, a sleeve rotatably mounted on said shaft rearwardly of said cutter head, a circumferential series of guide members mounted on said sleeve coextensive in length therewith and comprising forwardly and rearwardly extending flexible arm portions, elongated flexible guide pads secured to the forward and rearward ends of said arm portions for frictional engagement with the bored diameter of the work piece and in slidable lineal frictional contact therewith as the boring operation progresses, a plurality of radially disposed cutter tools carried by the cutter head, rotatable means carried by the cutter head for radially extending said cutter tools relative to the cutter head preparatory to starting the boring operation and for retracting said cutter tools relative to the bored diameter of the work piece at the end of the boring operation, said rotatable means comprising a hollow threadedly rotatable shaft extending into the cutter head provided at its outer end with a micrometric head and at its inner end with cam means, resilient means carried by said cutter head engaged with said cutter tools and at all times maintaining the inner ends of said cutter tools in intimate contact with said cam means whereby rotation of said hollow shaft and cam means in one direction will extend the cutter tools relative to the cutter head and rotation in an opposite direction will retract said cutter tools, and locking means extending through said hollow shaft and into said boring bar for locking said hollow shaft and cam means against rotation in either direction.

2. A boring device including a stationary boring bar comprising a shaft having a forward end and a rearward end,
- means at said rearward end mounting said shaft coaxially with a rotationally driven workpiece to be bored,
- a cutter head integrated with the forward end of said shaft,
- a sleeve rotatably mounted on said shaft rearwardly of said cutter head,
- a circumferential series of guide members on said sleeve coextensive in length therewith and comprising forwardly and rearwardly extending flexible arm portions,
- means mounting said guide members on said sleeve,
- said mounting means comprising spaced apart fastening elements extending through the guide members and into said sleeve,
- matching key slots in each of said guide members and in said sleeve and disposed intermediate said fastening elements,
- a key engaged with said key slots,
- elongated flexible guide pads carried by the forward and rearward ends of said arm portions of said guide members for frictional engagement with the bored diameter of the workpiece as the boring operation progresses,
- means mounting said guide pads to said ends of said arm portions,
- said last mentioned mounting means comprising forwardly and rearwardly aligned pins interconnecting and securing said pads to said arms in alignment therewith,
- a plurality of radially disposed cutter tools carried by the cutter head,
- rotatable means carried by the cutter head for radially extending said cutter tools relative to the cutter head preparatory to starting the boring operation and for retracting said cutter tools relative to the bored diameter of the workpiece at the end of the boring operation,
- said rotatable means comprising a hollow threadedly rotatable shaft extending into the cutter head provided at its outer end with a micrometric head and at its inner end with cam means,
- resilient means carried by said cutter head engaged with said cutter tools and at all times maintaining the inner ends of said cutter tools in intimate contact with said cam means,
- whereby rotation of said hollow shaft and cam means in one direction will extend the cutter tools relative to the cutter head and rotation in an opposite direction will retract said cutter tools,
- and locking means extending through said hollow shaft and into said boring bar for locking said hollow shaft and cam means against rotation in either direction.

References Cited in the file of this patent

UNITED STATES PATENTS

| | | |
|---|---|---|
| 953,282 | Wash | Mar. 29, 1910 |
| 1,214,649 | Cogsdill | Feb. 6, 1917 |
| 1,954,034 | Arp | Apr. 10, 1934 |
| 2,207,861 | Healy | July 16, 1940 |
| 2,883,892 | Tourison | Apr. 28, 1959 |